Oct. 20, 1925.
D. O'BANNON ET AL
1,557,604
AUTOMOBILE CURTAIN BRACKET
Filed Aug. 26, 1924
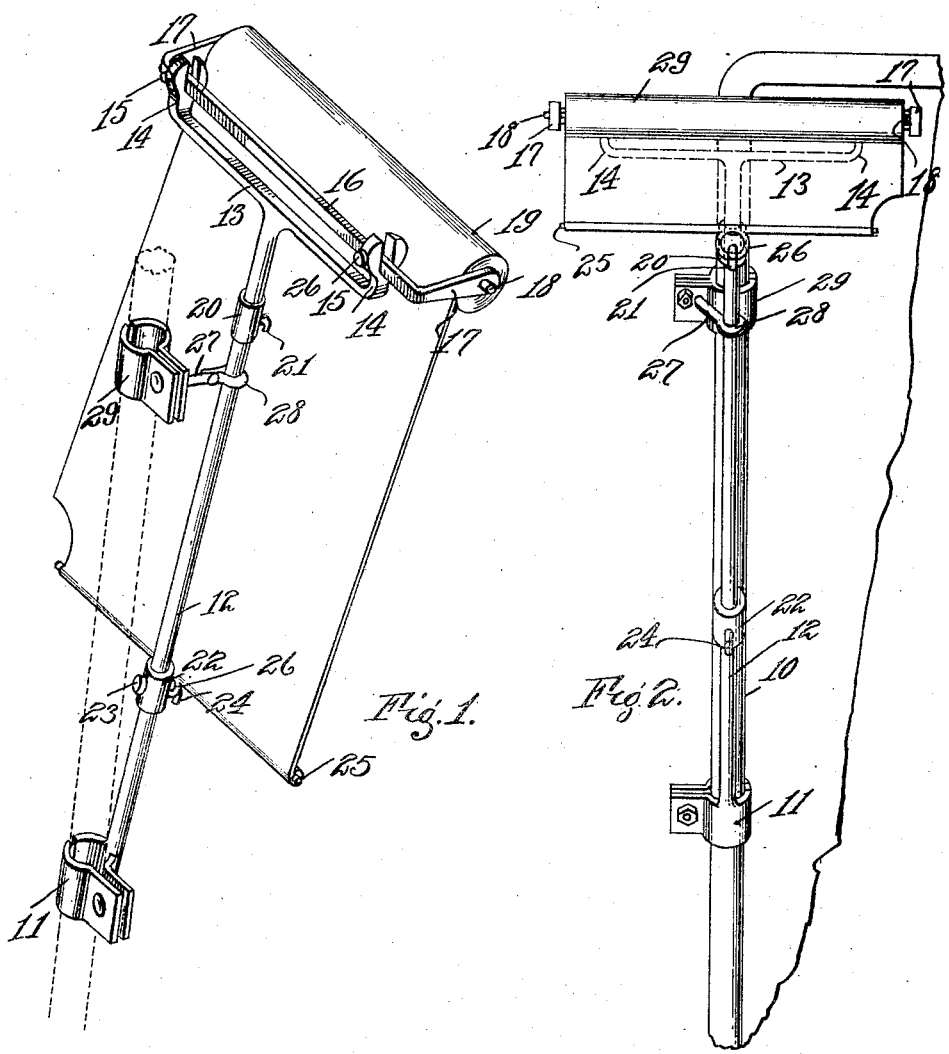
Inventors
Daniel O'Bannon
Joseph Napoleon
Dominick Napoleon
By Horace G. Chandlee
Attorney Patented Oct. 20, 1925.

1,557,604

UNITED STATES PATENT OFFICE.

DANIEL O'BANNON, JOSEPH NAPOLEON, AND DOMINICK NAPOLEON, OF ALBUQUERQUE, NEW MEXICO.

AUTOMOBILE CURTAIN BRACKET.

Application filed August 26, 1924. Serial No. 734,281.

*To all whom it may concern:*

Be it known that we, DANIEL O'BANNON, JOSEPH NAPOLEON, and DOMINICK NAPOLEON, citizens of the United States, residing at Albuquerque, in the county of Bernalillo, State of New Mexico, have invented certain new and useful Improvements in Automobile Curtain Brackets; and we do hereby declare the following to be a full, clear, and exact description of the invention, such as will enable others skilled in the art to which it appertains to make and use the same.

This invention relates to attachments for automobiles, and particularly to devices for protecting the eyes of a driver from the glare of approaching headlights.

One object of the invention is to provide a simple device of this character which can be easily and quickly attached to an automobile, without modification to the automobile.

Another object is to provide a device of this character which can be easily and quickly moved into position to protect the eyes of the driver, and which can be easily and quickly moved out of position when not needed.

Other objects and advantages will be apparent from the following description when taken in connection with the accompanying drawing.

In the drawing:

Figure 1 is a perspective view of the attachment in operative position, a portion of the windshield frame being shown in dotted lines.

Figure 2 is an elevation as viewed from the seat of the driver, the invention being shown in inoperative position.

Referring particularly to the accompanying drawing, 10 represents the vertical upright of the windshield of an automobile, in connection with which the present device is used. A clamp 11 is secured around the upright 10, at a suitable distance from the lower end of the upright, and formed on one side of this clamp, and extending upwardly and rearwardly, at an acute angle, is an arm 12, said arm having a transverse head 13, on its upper end, with the ends of said head turned upwardly in parallel arrangement, and bifurcated, as shown at 14. In one arm of each bifurcation there is engaged a screw 15, which is arranged to engage with and hold the curtain supporting rod 16 therein. The opposite ends of this rod 16 are bent to extend rearwardly, as at 17, and apertured for reception of the pintle ends of the roller 18, of the curtain 19.

Fixed on the arm 12, adjacent the head 13, and slightly therebelow, is a collar 20, and carried by this collar is a hook 21. A similar collar 22 is engaged on the arm 12, below the first collar, but adjustable longitudinally of the arm, by means of the screw 23. A hook 24 is carried by the collar 22. The lower end of the curtain 19 has a transverse rod 25, and from the center of this rod projects a loop or eye 26, which is adapted to be engaged with either of the hooks 21 and 24. This curtain 19 is preferably formed of a transparent colored material, which, while protecting the eyes of the driver from the glare of approaching headlights, will permit him to see therethrough.

The curtain is preferably of the spring roller type, so that when the eye 26 is disengaged from a hook the curtain will tend to wind on the roller. When the driver sees glaring headlights aproaching, he grasps the rod 25 and pulls the curtain down and engages the eye with the lower hook 24, thus causing the curtain to remain in front of his eyes, and protecting them from the glare.

When not to be used, the eye 26 is disengaged from the hook 24, and engaged with the hook 21, thus disposing the curtain above the driver's line of vision of the road ahead.

To maintain the arm 12 at the proper angle, a brace 27 is provided, said brace having a clamp 28 on one end which is secured around the arm 12, and a clamp 29, on its other end, which is engaged around the upright 10, of the windshield.

What is claimed is:

1. An attachment for an automobile windshield comprising an arm having means for attachment to the upright of a windshield and extending upwardly and inwardly therefrom, a bifurcated head on the arm, a spring roller supported in the bifurcated head and having a curtain thereon provided with a terminal eye, a brace between the arm and the upright, a stationary hook on the arm for engagement by said eye, and a hook adjustable longitudinally on the arm for engagement by said eye.

2. An attachment for an automobile windshield comprising an arm having means for attachment to the upright of a windshield and extending upwardly and inwardly therefrom, a transverse head on the upper end of the arm with the ends thereof bifurcated, a rod detachably secured in the said arm ends and formed for supporting the spring roller of a curtain, a brace between the arm and the upright, a stationary hook on the arm, an adjustable hook on the arm, and an eye on the curtain for engagement therewith.

In testimony whereof, we affix our signatures.

DANIEL O'BANNON,
JOSEPH NAPOLEON,
DOMINICK NAPOLEON.